United States Patent [19]
Eifer

[11] 4,023,782
[45] May 17, 1977

[54] TUYERE STOCK AND COMPENSATOR JOINT THEREFORE

[75] Inventor: Gerd Eifer, Radevorwald, Germany

[73] Assignee: S.A. des Anciens Etablissements Paul Wurth, Luxembourg, Luxembourg

[22] Filed: Sept. 5, 1975

[21] Appl. No.: 610,698

[30] Foreign Application Priority Data

Sept. 6, 1974 Germany ............................ 2442708
Sept. 6, 1974 Germany ............................ 2442709

[52] U.S. Cl. ................................. 266/186; 266/285;
285/47; 285/226
[51] Int. Cl.² ............................................ C21B 7/16
[58] Field of Search ............ 266/265, 270, 47, 218,
266/186–188; 110/182.5; 122/6.6; 285/226,
229, 45, 47

[56] References Cited
UNITED STATES PATENTS

| 3,490,794 | 1/1970 | Swanson ........................ 285/226 X |
| 3,662,696 | 5/1972 | Mahr et al. ...................... 110/182.5 |
| 3,766,868 | 10/1973 | Mahr ............................... 110/182.5 |
| 3,820,829 | 6/1974 | Hasselbacher et al. ........... 285/226 |
| 3,901,539 | 8/1975 | Ijzerman ........................... 285/45 X |

FOREIGN PATENTS OR APPLICATIONS 151,362  1962  U.S.S.R. ................. 110/182.5

Primary Examiner—Gerald A. Dost

[57] ABSTRACT

A hermetic expansion joint for use between conduits lined with refractory material and a tuyere stock for blast furnaces utilizing a plurality of such expansion joints. The expansion joints include a bellows coaxial with and connected to the exterior of the conduits to be coupled and, located within the bellows, a shielding tube and a protective layer of compressible refractory material. The compressible refractory layer is positioned within the shielding tube and bridges the joint between the conduits.

20 Claims, 10 Drawing Figures

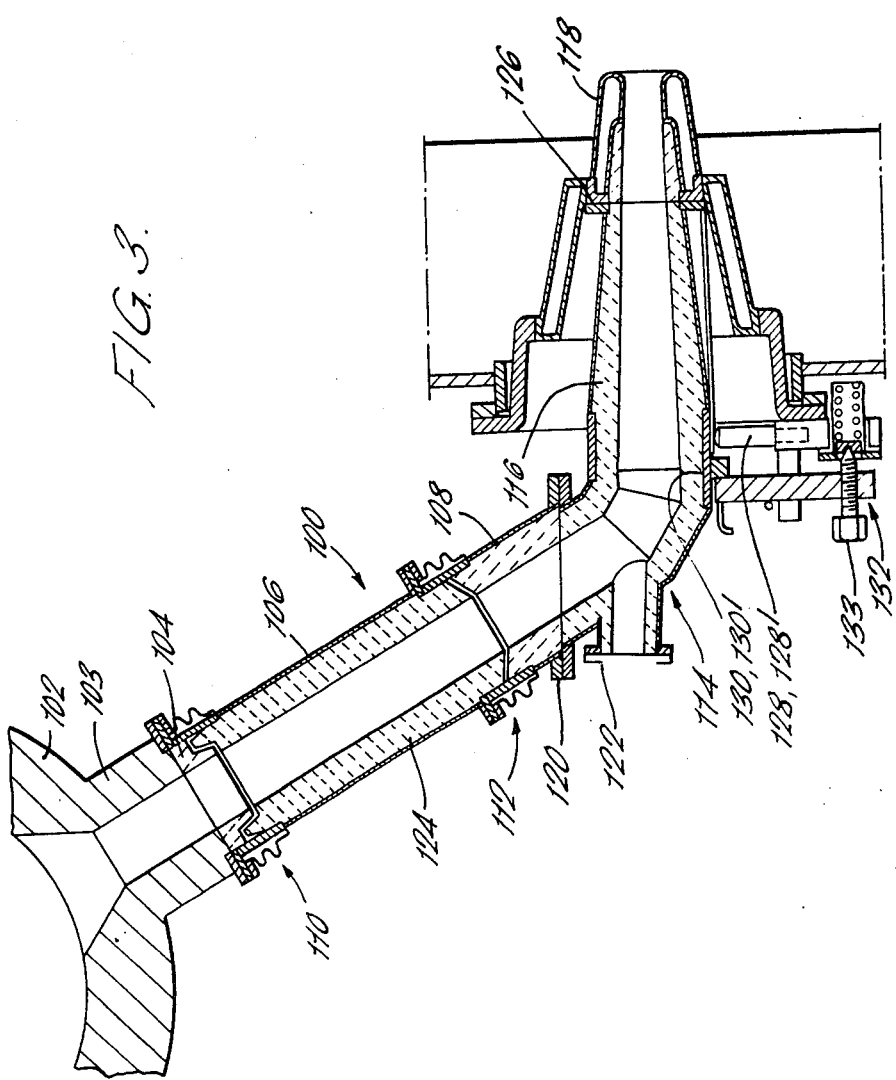

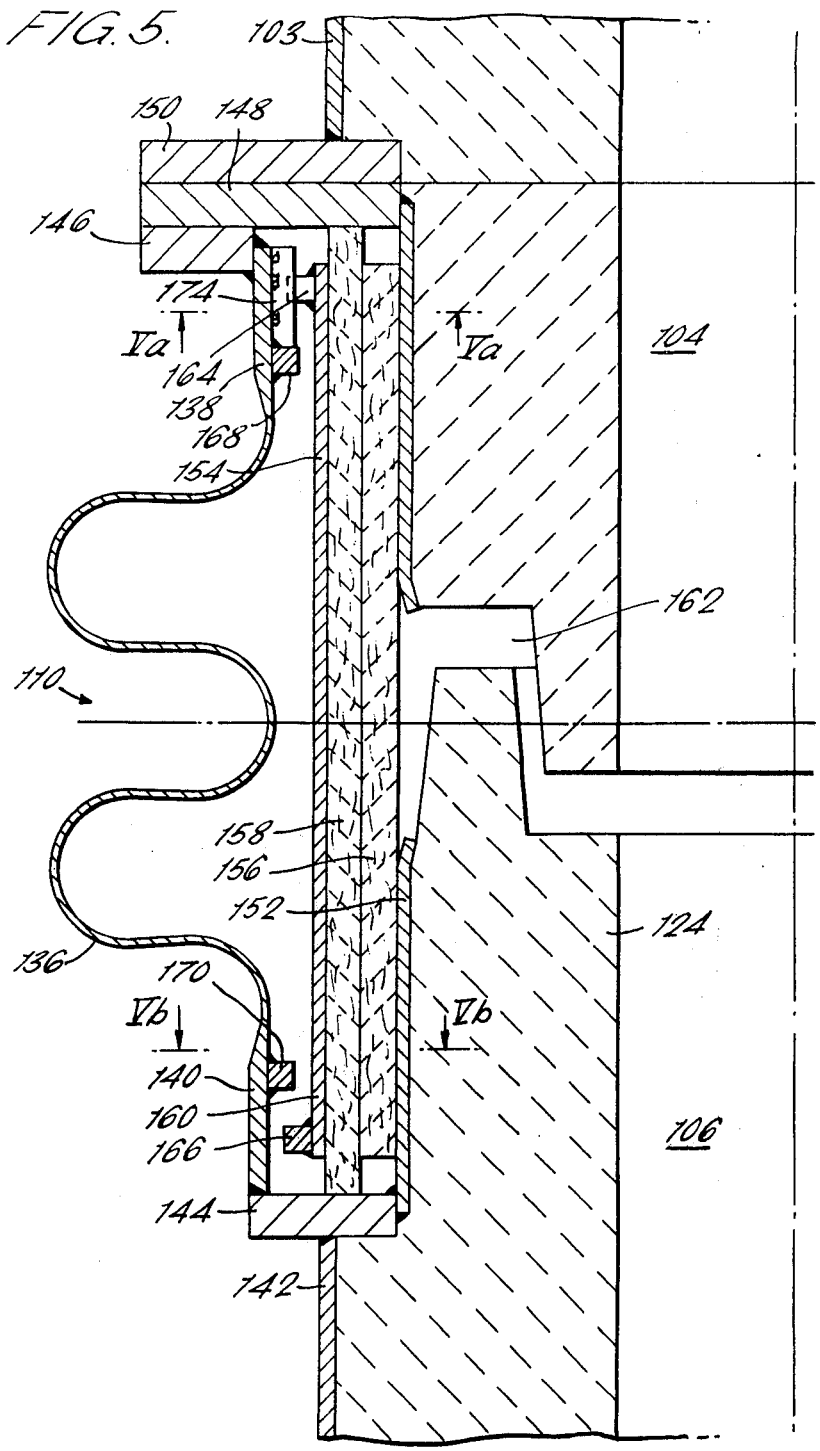

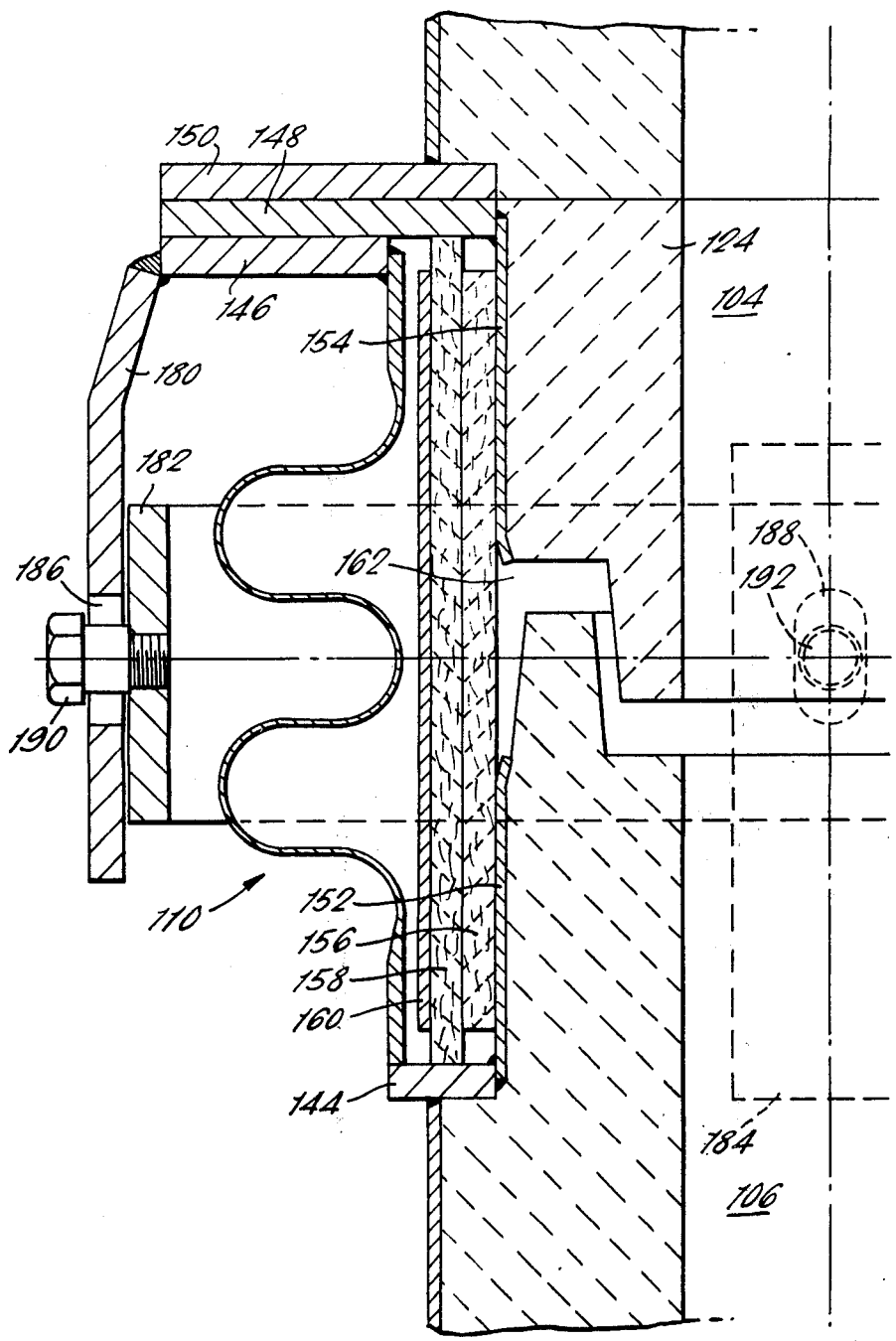

TUYERE STOCK AND COMPENSATOR JOINT THEREFORE

BACKGROUND OF THE INVENTION

1. Field of the Invention

The present invention relates to the transmission of heated fluid and particularly to the delivery of "hot blast" air from a source to a shaft furnace. More specifically, this invention is directed to segmented conduits, such as tuyere stocks, which are utilized to conduct heated fluids and especially to hermetic expansion joints for employment between the segments of such conduits. Accordingly, the general objects of the present invention are to provide novel and improved methods and apparatus of such character.

2. Description of the Prior Art

While not limited thereto in its utility, the present invention has been found to be particularly well suited for use as a compensator connection between serially arranged conduits which are provided with an inner refractory lining. Such lined conduits are employed, for example, in tuyere stocks for the delivery of hot air to a blast furnace. In the environment of a tuyere stock the fluid passing through the lined and serially arranged conduits may be heated to temperatures up to 1400° C. The compensator connections or expansion joints between the conduits must, accordingly, be hermetic and additionally must permit thermally induced expansion of the conduits.

Continuing with a discussion of the environment of a blast furnace, it is conventional for such furnaces to be provided with an external circular conduit, known in the art as a "bustle pipe" or "hot blast" conduit, which receives preheated air from a heat exchanger known as a hot blast stove. This bustle pipe extends around the furnace and the heated air, also called the "hot blast", is delivered therefrom for injection into the furnace via a plurality of segmented conduits, known in the art as tuyere stocks, located on the periphery of the furnace. The tuyere stocks generally comprise a plurality of serially coupled conduits which are provided with a refractory lining. A tuyere stock is customarily rigidly coupled, at its upstream end, to a fitting on the bustle pipe by means of a flange or other similar connecting device. In order to absorb or compensate for manufacturing, assembly and installation tolerances, and particularly to compensate for deformations and distortions which occur during use, some or all of the conduits which comprise the tuyere stock are interconnected by means of expansion bellows, spherical swivel articulations, Cardan compensators or other similar expansion joint defining devices. These expansion joint defining devices or compensator connections permit the intermediate conduit or conduits of the tuyere stock to move with respect to the conduit which is rigidly connected to the "bustle pipe" and with respect to the tuyere or nozzle which projects through the furnace wall. For economic and safety reasons, such movement must occur without escape of the heated fluid being conducted through the tuyere stock.

A known tuyere stock which includes expansion joints of the universal coupling or "Cardan" compensator type is disclosed in U.S. Pat. No. 3,662,696. The Cardan compensators of U.S. Pat. No. 3,662,696 offer the advantages that differential deformations of the individual conduits, resulting from the high temperature of the air being delivered to the furnace, are compensated by means of bellows which have a limited number of corrugations and without utilization of ball-and-socket joints.

In the tuyere stock of U.S. Pat. No. 3,662,696 the blast nozzle of the tuyere stock is pressed firmly against the blast tuyere in the furnace wall in the conventional manner through the use of suitable clamping devices. Thus, in U.S. Pat. No. 3,662,696 the contact between the nozzle, which is the downstream section of the tuyere stock, and the tuyere is defined by a spherical sealing surface which compensates for any relative displacements between the nozzle and tuyere. Tuyere stocks of the type shown in U.S. Pat. No. 3,662,696 generally employ a first pair of coupling compensators in a first linear portion between the bustle pipe and an elbow section, which couples the substantially linear upstream portion of the stock to the nozzle, as well as the third articulated or swivel joint in the vicinity of the furnace wall such as, for example, between the nozzle and the blast tuyere or between the nozzle or the blast tuyere and the wall of the furnace. Tuyere stocks of the general type disclosed in U.S. Pat. No. 3,662,696 are thus known in the art as "three hinged" stocks.

Tuyere stocks of the "two hinged" type are also known. In the latter type of "hot blast" transmission conduit the nozzle portion of the tuyere stock is rigidly connected to the blast tuyere in such a manner that the refractory internal lining within the nozzle and tuyere is substantially continuous. In the use of such "two hinged tuyere stocks" means must be provided to maintain the integral nozzle and tuyere in a preselected position relative to the wall of the furnace. This requisite position maintenance, in turn, results in the absence of an articulated connection at the furnace wall. The resultant necessary forced guidance or support of the nozzle, which does not allow any lateral movement, requires the employment of compensators which can absorb or compensate for both angular deviation and longitudinal displacement; such compensators being incorporated between the individual segments of the tuyere stock which are located between the elbow and "bustle pipe". Compensation for both angular deviations and longitudinal sliding displacements may be obtained through the use of universal coupling connections provided with elongated slots on the hinged arms thereof; such slots limiting longitudinal displacements in two directions and facilitating the assembly of the tuyere stock. A tuyere stock of the "two hinged" type is shown in pending U.S. Patent Application Ser. No. 339,117 which is assigned to the assignee of the present invention.

To briefly summarize the state of the art, in conduits intended for use in the transmission of very hot fluids, for example in tuyere stocks, an expansion joint is provided between the refractory internal lining of adjacent serially arranged conduit sections. A corrugated or bellows-type compensator is disposed around the expansion joint and connected to the adjacent conduit sections in order to seal the joint therebetween from the surrounding atmosphere while compensating for deformations of the conduit sections resulting from thermally induced expansion. The corrugated or bellows-type compensators are the components of a compensator connection most susceptible to damage and, particularly in the case of a tuyere stock for a blast furnace, these elements must be shielded from the heated fluid passing through the conduit. In order to obtain the requisite thermal shielding, resort has previously been had to defining, by means of the refractory lining material of the conduit sections, a cascaded joint and filling such joint with a refractory and compressible special mineral wool. Alternatively, sperical joints have been provided between adjacent conduit sections.

In the design of a hermetic expansion joint, and particularly a joint between the refractory internal linings of adjacent conduits of a tuyere stock, two conflicting design requirements are observed and the resulting expansion joint is necessarily a compromise between these two conflicting requirements. The first requirement is the necessity of minimizing the width of the joint so that the bellows are not directly exposed to the heated fluid being conveyed and to avoid the occurrence of a hot air whirl. The second requirement is the need to make the joint sufficiently wide so as to obviate the possibility of contact between the facing refractory linings; any such contact impeding the movements which the compensator is intended to absorb and also causing damage to the linings.

Although the above briefly described expansion joints or compensator connections have been successfully employed, and offer a satisfactory solution to the above-discussed design compromise, it has nevertheless been recognized that improvements in such expansion joints were warranted in order to facilitate relative movements of the individual conduit segments and/or to enhance the shielding of the bellows of the compensators.

SUMMARY OF THE INVENTION

The present invention provides a novel and improved compensator connection for use in a segmented conduit employed to transmit heated fluids and a conduit employing such compensator connections. Compensator connections in accordance with the present invention are characterized by a hermetic expansion joint which allows substantial axial expansion of a segmented conduit conveying hot gas while simultaneously affording a high degree of thermal shielding of the bellows which imparts hermeticity to the joint. The present invention is further characterized by a compensator connection which is suitable for use in tuyere stocks of both the "two hinged" and "three hinged" type and which may accommodate and possibly limit displacements occurring in any direction.

In accordance with the present invention a compensator connection between a pair of refractory lined conduits is provided with a shielding tube which is positioned between the bellows of the compensator and the refractory inner linings which are exposed to the hot fluid being conveyed. The shielding tube is coaxial with the bellows and the refractory inner linings and extends in both the upstream and downstream directions so as to completely cover the expansion joint defining gap between the linings. In a preferred embodiment, a compensator connection in accordance with the invention also includes at least a first protective layer of refractory material positioned radially inwardly from the shielding tube so as to be disposed between the shielding tube and the inner lining.

The refractory protective layer disposed inwardly with respect to the shielding tube is preferably comprised of a material having a degree of elasticity. This protective layer aids in shielding the bellows of the compensator connection from the expansion joint and thus isolates the bellows from the fluid being transmitted through the conduit. To enhance the shielding effect of this elastic refractory material, the compensator connection is assembled in such a manner as to place the protective layer of refractory material in compression. In accordance with one embodiment of the invention the refractory inner linings are at least in part maintained in position by means of support bushings which additionally extend radially outwardly so as to position the elastic layer of protective refractory material.

A tuyere stock in accordance with the present invention is provided with at least two compensator connections separated by an elongated conduit. In such an improved tuyere stock, axial relative displacements of adjacent conduits are limited by abutment studs while bending or compressional movements are limited by the shielding tube of the compensator connection. The abutment studs which limit axial displacement may be provided either on the shielding tube, on the connection fittings of the bellows or may form part of the universal coupling which mechanically interconnects adjacent conduits. The minimal axial length of the expansion joint can be limited by the length of the shielding tube. Thus, when the corrugations of the bellows are compressed, the ends of the rigid shielding tube are urged against flanges provided on the adjacent conduits thus preventing the refractory lining on the conduits from coming into contact in the region of the expansion joint.

In accordance with a further embodiment of the invention the compensator connection is provided with a locking element, typically in the form of a nut-spring connection, which prevents rotational movement of the shielding tube.

BRIEF DESCRIPTION OF THE DRAWINGS

The present invention may be better understood and its numerous objects and advantages will become apparent to those skilled in the art by reference to the accompanying drawing in which:

FIG. 3 is a cross-sectional side elevation view of a two hinged tuyere stock employing compensator connections in accordance with the present invention;

FIG. 5 is a cross-sectional side elevation view of onehalf of an annular compensator connection in accordance with a third embodiment of the invention, the compensator connection of FIG. 5 consisting of the other of the compensator connections of FIG. 3;

FIG. 6 is a cross-sectional side elevation view of onehalf of an annular compensator connection in accordance with another embodiment of the invention.

DESCRIPTION OF THE PREFERRED EMBODIMENTS

Figure 1:
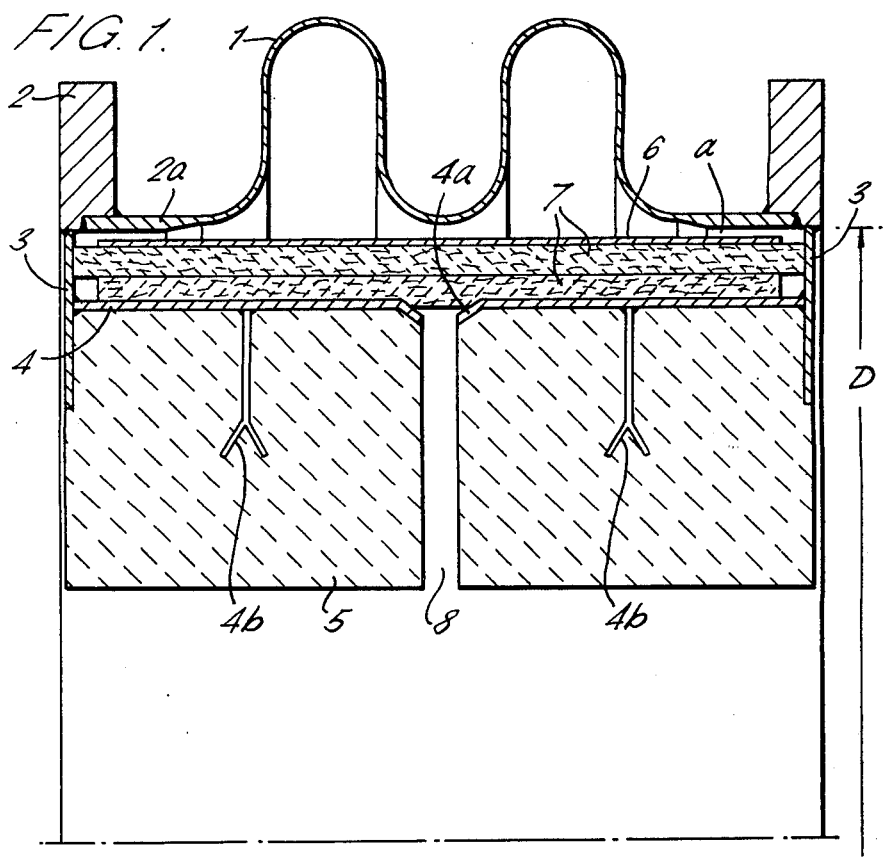
FIG. 1 is a cross-sectional side elevation view of the upper half of an annular compensator connection in accordance with a first embodiment of the invention.

With reference now to FIG. 1, a compensator connection including a bellows 1, which affords hermeticity to the expansion joint between adjacent conduits, is depicted in cross-section. Bellows 1 is provided, at its opposite ends, with connection fittings 2a which are attached, by any suitable means, to flanges 2. Holding discs 3 extend radially inwardly from flanges 2. Annular supporting bushings 4 are attached to the holding discs 3 such as, for example, by welding as shown. The holding discs 3 and supporting bushings 4 support and retain in position a refractory lining 5. The support function of the bushings 4 may be enhanced by providing thereon maintaining members such as indicated at 4b; members 4b being welded to the supporting bushings and extending radially into the refractory material 5. The refractory lining 5 is divided into two segments which define therebetween an expansion joint or gap 8. The supporting bushings 4 terminate at expansion joint 8 and are provided with facing inwardly inclined forward end portions 4a.

A steel shielding tube 6 is positioned in the annular chamber between holding discs 3, the supporting bushings 4 and the bellows assembly. For the purposes to be described below, shielding tube 6 is spaced inwardly from the inner diameter "D" of the bellows connection fitting 2a by a radial distance "a". Shielding tube 6 is also shorter than the axial distance between the holding discs 3 whereby tube 6 may move in the axial direction. An insert 7 of a compressible refractory material, preferably a double layer of refractory felt, is positioned between shielding tube 6 and the bushings 4 and is typically maintained in position by use of a suitable adhesive. In accordance with a preferred embodiment the layer or layers of refractory material 7 are slightly compressed between the shielding tube 6 and the supporting bushings 4. The refractory material 7 protects the bellows 1 from exposure to the heated gas being transmitted through the conduit. In designing the compensator connection the width of expansion joint 8 and the axial mobility of shielding tube 6 are, of course, mutually selected and the components of the expansion joint suitably sized.

Figure 2:
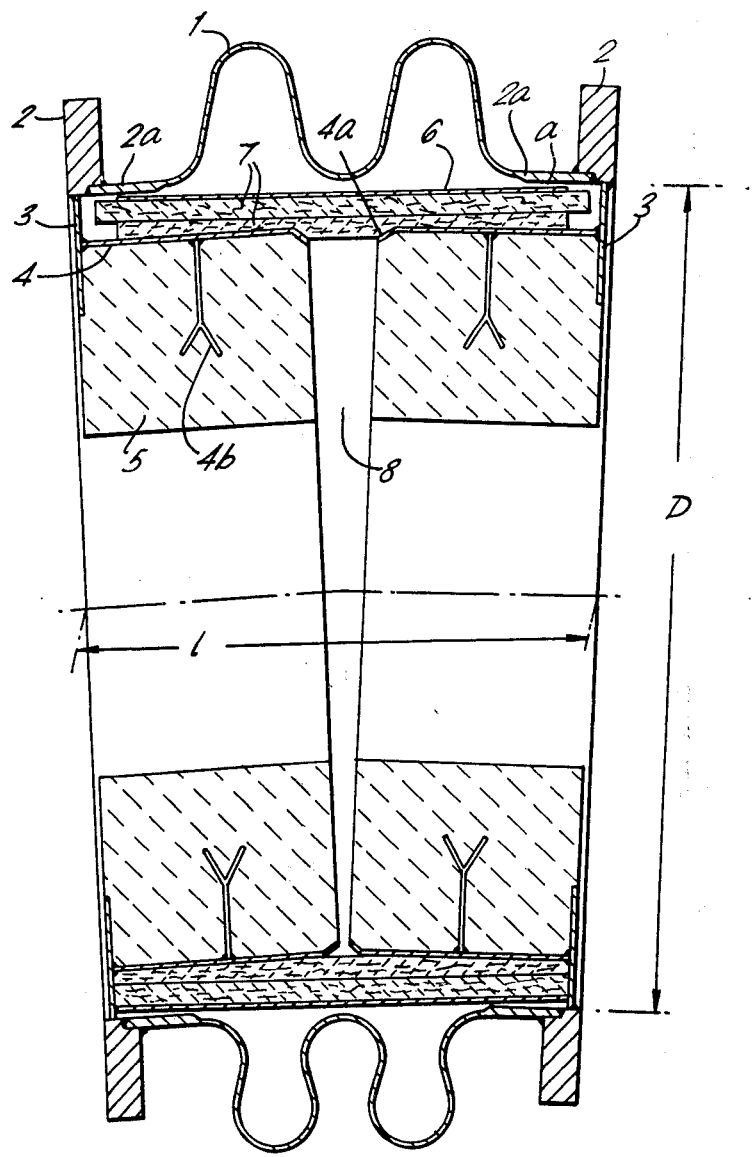
FIG. 2 is a cross-sectional side elevation view depicting the entire compensator of FIG. 1 subjected to a buckling stress.

Referring now to FIG. 2, the compensator connection of FIG. 1 is shown undergoing a buckling stress such as may be encountered as a result of thermal expansion of the conduit segments of a tuyere stocks. In the condition depicted in FIG. 2 the refractory material 7 at the upper side of the compensator is being further compressed in the vicinity of the radially inwardly tapering ends 4a of supporting bushings 4. Simultaneously, the fittings 2a on bellows 1 are caused to move inwardly toward the opposite ends of shielding tube 6. Because the shielding tube 6 is spaced a sufficient radial distance "a" from fittings 2a, tube 6 is not contacted by the fittings and thus not subjected to a buckling stress. During the opposed displacement of the lower or opposite part of the compensator connection, the ends 4a of bushings 4 are deflected away from the refractory layer 7 while this layer of material is further compressed in the region of the opposite extremities of the support bushings 4 as shown. Again, at the bottom of the stressed compensator, the radial spacing "a" between shielding tube 6 and fittings 2a insures that there will be no contact between either the fittings or the corrugations of the bellows and shielding tube 6. The compression of the refractory material 7 further enhances the shielding effect of this material insofar as exposure of the interior of bellows 1 to hot gases being transmitted through the conduits are concerned.

It is particularly to be noted that the inwardly sloped ends 4a of supporting bushings 4 are designed in the interest of avoiding damage to layer 7 as might occur by the forcing of a sharp corner into the refractory material during the condition depicted in FIG. 2. This protection may be enhanced by making the supporting bushings 4 slightly wedge-shaped in the radially outward direction and in the direction of expansion joint 8. The sloping of the facing ends 4a of bushings 4 toward the axis of the conduit extends the service life of the joint and facilitates the assembly thereof.

Compensator connections in accordance with the present invention have been found to afford effective shielding of the bellows from the hot gas being transmitted for comparatively wide expansion joints. Additionally, compensator connections in accordance with the invention have the unique ability to accept both axial and buckling stresses. The shielding of the bellows, in the face of buckling stresses, is achieved through the use and cooperation of the shielding tube 6 and compressible refractory material 7 which prevent direct thermal radiation from the fluid being transmitted to the bellows. The compressible refractory layer 7 additionally prevents formation of hot air whirls as well as preventing circulation of hot air between the corrugations of the bellows element of the compensator. Thus, the nature and thickness of the refractory material which comprises layer 7 will be selected in accordance with the intended use of the compensator connection so that the material completely isolates the bellows from the gases being transmitted through the conduit.

In the embodiment of FIG. 1 the width of joint 8 is limited by cooperation between the holding discs 3, which provide lateral mounting support for the refractory lining at both ends of the compensator connection, and shielding tube 6. The gap between the ends of the shielding tube and discs 3 must, of course, be greater than the permitted expansion of the compensator connection. When particularly severe thermal conditions are to be encountered, it has been found advantageous to fabricate shielding tube 6 from a refractory or heat resistant steel. The shielding tube 6 may also be provided with a refractory inner lining which will function to support the compressible layer of refractory material 7; layer 7 still performing the sealing and shielding function which protects bellows 1 from exposure to the hot gases. As noted above, the refractory layer 7 will preferably be compressed between the inner diameter of shielding tube 6 and the outer diameter of the supporting bushings 4, if present, or the refractory inner lining 5. The degree of compression will, of course, be dependent upon the material chosen for refractory layer 7; up to 15% compression having been employed successfully.

The shielding tube 6 is, as noted above, spaced radially inwardly from the fittings 2a of the bellows by a distance "a". The spacing distance "a" is determined by the constructive length "1" of the compensator connection and the inner diameter "D" of the connection fittings 2a so as to allow a buckling displacement as depicted in FIG. 2. The combination of the radial distance "a" and the broad expansion joint 8 which is possible in accordance with the present invention without detrimental effects on the bellows 1 permits the expansion joint to compensate for buckling displacements previously considered impossible for compensator connections intended for hot air ducts. Thus, for a shielding tube of length "b" equals 572 mm, and a maximum buckling stress of $\alpha = \pm 2°$, the minimum value of the radial distance "a" may be determined as follows:

$$a = (\tan \alpha/2)(b/2) = 0.0175 \times 286 = 5 \text{ mm}$$

In order to insure that there will be no contact between the shielding tube 6 and the connection fittings 2a, the distance "a" is usually selected to be 2 to 2.5 times the calculated minimal value.

Referring now to FIG. 3, a tuyere stock employing the compensator connections of the present invention is indicated generally at 100. The tuyere stock 100 delivers hot air from a "hot blast" conduit or "bustle pipe" 102 to a blast tuyere 118 which projects through the wall of a blast furnace. The tuyere stock comprises an essentially straight section defined by three serially connected conduits 104, 106 and 108. The conduits 104, 106 and 108 are, of course, provided with a refractory lining 124. A compensator connection indicated generally at 110 couples conduits 104 and 106 while a second compensator connection, indicated generally at 112, couples conduit 106 to conduit 108. The downstream end of conduit 108 is coupled, by means of a flange connection 120, to a bend or elbow 114; flange 120 generally being horizontally oriented to enable removal of the elbow 114 and the tuyere stock elements located downstream thereof. The elbow 114 of the tuyere stock 100, which provides fluid communication between the conduit 108 and a tuyere nozzle 116, is provided with an inspection hole 112 through which the "blowing-in" process in the furnace can be observed. All of segments 104, 106, 108, 114 and 116 of the tuyere stock are comprised of welded steel plates and, as noted, are provided with a refractory lining 124.

The tuyere 118 will typically be comprised of copper. In the embodiment of FIG. 3 the tuyere 118 is rigidly attached to the tuyere stock, and particularly to nozzle segment 116, by means of a flange and bolt connection 126. A pair of guide bolts 128 and 128' are provided to maintain the nozzle 116 and tuyere 118 in a preselected and preferably horizontal position. The guide bolts 128 and 128' are mounted in a frame fixed to the furnace wall and situated below the nozzle 116. The nozzle 116 is provided, on the lower side thereof, with sliding surfaces 130 and 130' comprised of thick steel plates; these sliding surfaces extending parallel to the longitudinal axis of the nozzle. The nozzle-tuyere assembly is urged, by means of a clamping device 132, against the wall of the furnace. The clamping device 132 is provided with a set screw 133 which may be adjusted to vary the pressure with which the nozzle-tuyere assembly is urged against the furnace within predetermined limits. The incorporation of the guiding and pressure biasing means to the assembly results in the nozzle 116, tuyere 118 and elbow 114 forming a unit which is retained at all times in the same position in relation to the furnace wall; this position being such that the axis of nozzle 118 is as close to horizontal as is possible. Restated, the means by which the tuyere stock is supported on the furnace renders it virtually impossible for the blast nozzle 116 and tuyere 118 to tilt out of their centered position.

Tuyere stocks of the type shown in FIG. 3 are, as noted above, known in the art as "two hinged tuyere stocks" because of their employment of only two articulated connections 110 and 112. Such tuyere stocks may be contrasted with the "three hinged tuyere stocks" which have a further articulated connection at the wall of the blast furnace and do not employ the guiding and pressure biasing means of FIG. 3.

Figure 4:
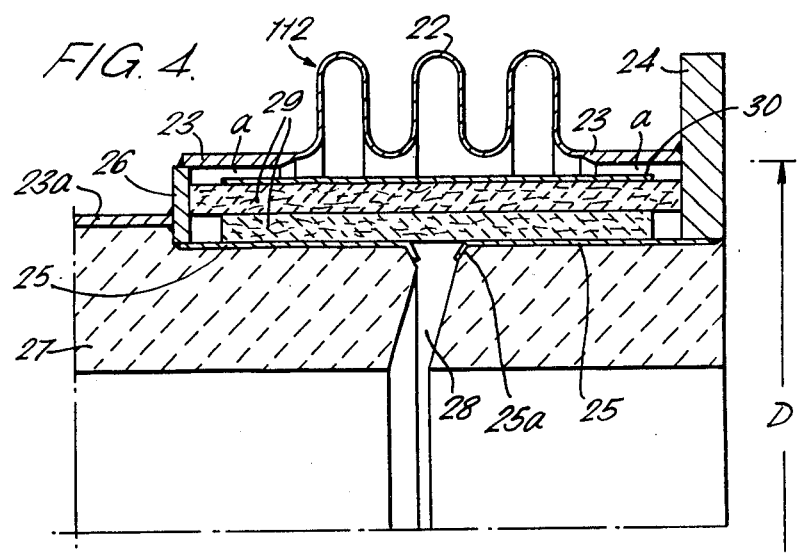
FIG. 4 is a cross-sectional side elevation view of the upper half of an annular compensator connection in accordance with a second embodiment of the invention, the compensator connection of FIG. 4 consisting of one of the compensator connections depicted in FIG. 3.

FIG. 4 is an enlarged cross-sectional view of the compensator connection 112 of the tuyere stock of FIG. 3. Compensator connection 112 comprises, similarly to the embodiment of FIGS. 1 and 2, a bellows 22, connection fittings 23 and a flange 24; the embodiment of FIG. 4 employing a flange 24 only at one side of the connection. At the side of the connection opposite to flange 24 the fitting 23 on bellows 22 is welded to a holding disc 26 which is oriented transversely to the axis of the connection. Supporting bushings 25 are mounted to the radially inwardly disposed ends of flange 24 and holding disc 26 as shown; bushings 25 extending axially toward one another and terminating in the vicinity of an expansion joint 28. The bushings 25 support the refractory lining 27 which actually defines the expansion joint. The supporting bushings 25 extend concentrically about the axis of the connection and cooperate with the fittings 23, bellows 22, flange 24 and holding disc 26 to define a generally annularly shaped chamber. A shielding tube 30 is positioned within this annular chamber and is spaced radially inwardly from the inner diameter of fittings 23 by a distance "a".

The refractory lining 27 on the conduit segments being coupled by compensator connection 112 defines, as noted above, a relatively wide expansion joint 28 which extends, without labyrinth design, in a slanting direction toward the exterior of the connection. The ends 25a of the supporting bushings 25 are, as in the embodiment of FIG. 1, inclined toward the interior of the compensator at the edge of expansion joint 28. As was also the case in the FIG. 1 embodiment, an internal protective layer 29 of refractory material is attached, preferably by an adhesive, to the inner wall of the shielding tube 30. Refractory layer 29, which is preferably comprised of a double layer of a suitable elastic refractory material, is thus positioned between the shielding tube and the supporting bushings 25. The dimensions of the supporting bushings, shielding tube and refractory layer 29 are selected such that layer 20 is slightly compressed in the undistorted position shown. The shielding tube 30 is "movable" in the axial direction within predetermined limits by virtue of its being shorter than the distance between flange 24 and disc 26. The expansion of the compensator connection 112, the width of expansion joint 28 and the dimensions of shielding tube 30 are interrelated and these parts are thus suitably dimensioned with respect to one another. The spacing between the ends of the shielding tube and the elements 24 and 26 is preferably on the order of 10 mm in excess of the permitted expansion of bellows 22.

The compensator connection 112 of FIG. 4 is especially intended for use with the "two hinged tuyere stock" of the type shown in FIG. 3. The design of the connection of FIG. 4 is predicted on the fact that the bellows 22, which is disposed in an inclined position, is not overloaded by its own weight and the weight of the conduit segments since the tuyere stock is supported from the furnace wall on the guiding and pressure biasing elements.

Figure 5A:
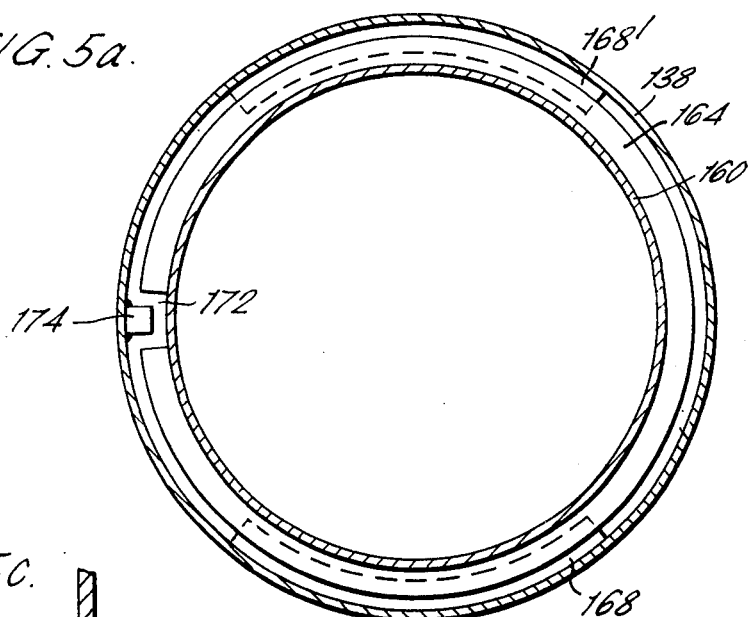
FIGS. 5a and 5b are cross-sectional views, respectively taken along lines Va—Va and Vb—Vb of FIG. 5.

FIG. 5 shows, in cross-section, a further embodiment of a compensator connection which is suitable for use with tuyere stocks of either the "two hinged" or "three hinged" type. Thus, referring again to FIG. 3, the connection of FIG. 5 may be considered to the upper compensator device 110 disposed between conduits 104 and 106. Compensator connection 110 comprises a bellows 136 which is connected, respectively, by means of an upper connection fitting 138 and a lower connection fitting 140, to an upper flange 146 and a lower annular disc 144. The lower annular disc 144, and thus the lower end of bellows 136, is welded or otherwise attached to the steel outer shell 142 of the conduit 106. The upper flange 146, and thus the upper end of bellows 136, is connected by means of an intermediate flange 148 and a further flange 150 to a fitting 103 which extends outwardly from the bustle pipe 102.

The facing ends of conduits 104 and 106 are provided, within the zone of the compensator connection 110, respectively with metallic support bushings 154 and 152. The refractory lining 124, which defines the expansion joint 162, is formed over and supported on bushings 152 and 154. The bushings 152 and 154, in cooperation with bellows 136 and its fittings and the upper and lower flanges to which the bellows fittings are attached, defines an annular chamber. A shielding tube 160 and a protective layer of compressible refractory material, preferably formed as two layers 156 and 158, are positioned within this annular chamber. The shielding tube 160 is preferably comprised of heat resistant steel. The radially outwardly disposed layer of compressible refractory material 158 is of greater length than the inner layer 156. As in the above described embodiments, the compressible refractory material 156, 158 isolates the bellows 136 from direct temperature radiation from the hot air being transmitted through the tuyere stock and prevents the circulation of hot air between bellows 136 and the shielding tube 160.

The facing ends of the refractory lining 124 on conduits 104 and 106 are complimentary shaped to define the labyrinth-shaped expansion joint 162. The expansion joint 162 may be filled with a refractory, elastic mineral wool. The labyrinth shape of expansion joint 162 is a supplementary measure employed in the interest of further insuring against the radiation of the hot air through the expansion joint towards the periphery of the compensator connection. However, as will be obvious from the embodiments of FIGS. 1 and 4, a labyrinth type expansion joint is not mandatory to successful functioning of the present invention.

The shielding tube 160 is provided, at its upper end, with a radially outwardly extending holding ring 164. As its opposite or lower end the shielding tube 160 has, attached to its outer surface, a pair of ring segments 166 and 166'. The holding ring 164 and ring segments 166 and 166' may best be seen from a joint consideration of FIGS. 5, 5a and 5b. As may also be seen from FIG. 5a, the upper connection fitting 138 on bellows 136 is provided with a pair of radially inwardly extending support ring segments 168 and 168'. FIG. 5b shows that the lower connection fitting 140 on bellows 136 is also provided with inwardly extending support ring segments 170 and 170'. The support ring segments are attached to the connection fittings of bellows 136 by welding and the support ring segments, as well as the holding ring segments 166 and 166' on shielding tube 160, extend over an arc which does not exceed 90°. The holding ring 164 extends about the periphery of shielding tube 160 and is provided with at least a first notch 172. The notch 172 cooperates with a removable locking element 174 to prevent rotational displacement of shielding tube 160. The locking element 174, which in the installed position extends radially inwardly so as to engage notch 172, may be best seen from FIG. 5. If deemed necessary or desirable, the holding ring 164 may be provided with a second notch oppositely disposed to notch 172 which is engaged by a second locking element similar to element 174. The provision of a second locking element and cooperating notch will obviously add mechanical strength to the assembly.

Figure 7:
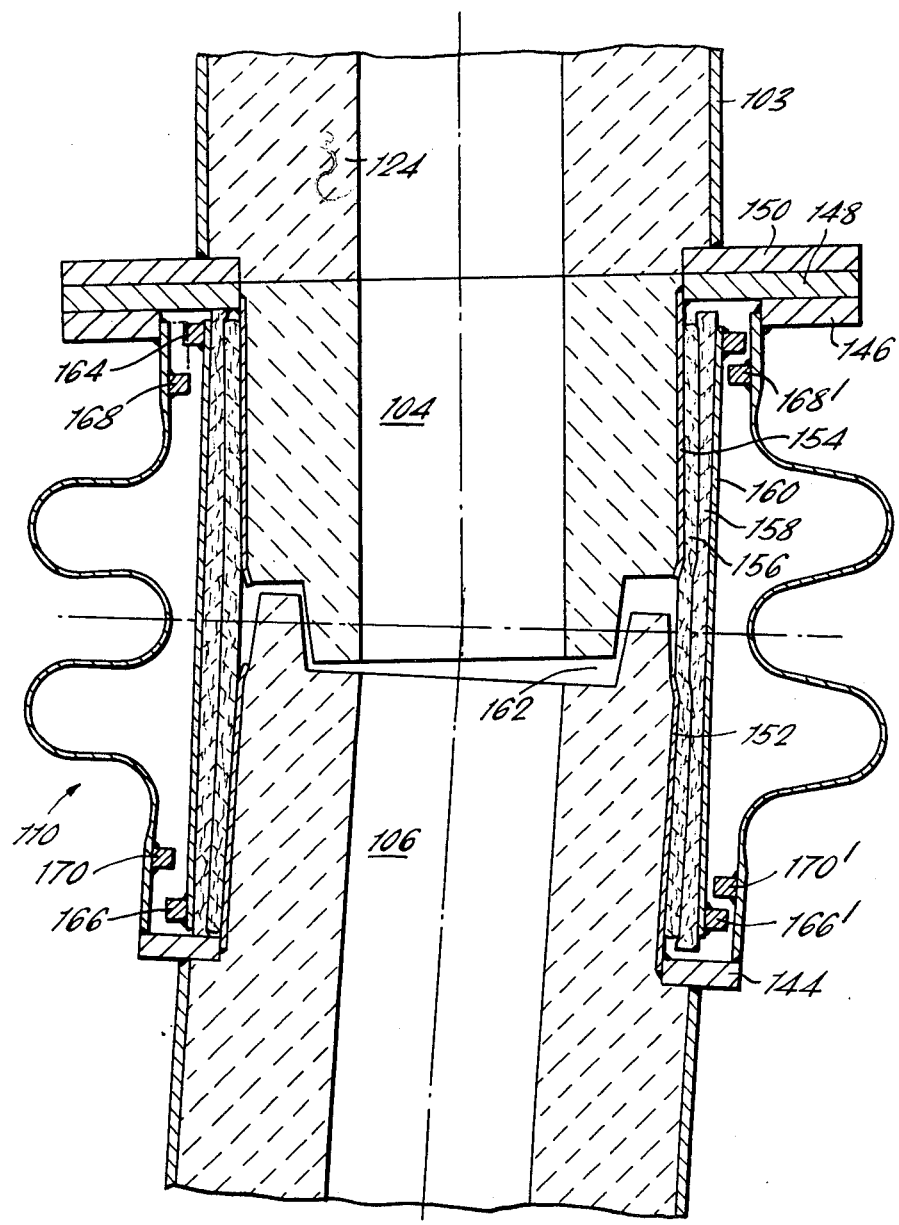
FIG. 7 is a cross-sectional side elevation view depicting the entire compensator connection of FIG. 5 during a buckling displacement.

The construction of the compensator connection 110 of FIG. 5, as will now be obvious to those skilled in the art, allows relative displacements of the individual conduits 104 and 106. Thus, conduits 104 and 106 may move longitudinally thus causing the expansion joint 162 to become wider or narrower. Also, the conduits 104 and 106 may undergo a buckling displacement as depicted in FIG. 7. The cooperation between the holding ring 164 and ring segments 166 and 166' on shielding tube 160 and the support ring segments 168, 168' and 170, 170' on the connection fittings of the bellows limits the maximum axial expansion of bellows 136 and thus the maximum width of joint 162. The maximum expansion of bellows 136 corresponds to the position where the supporting ring segments 168, 168' and 170 and 170', respectively, abut the holding ring 164 and holding ring segments 166 and 166'. The holding ring and supporting ring segments thus, in the position of maximum axial extension of the expansion joint, perform the function of a stop with the developed forces being transmitted in the rigid shielding tube 160. The axial mobility of conduits 104 and 106 in compression is limited by the length of the shielding tube 160 which will, in the position of minimum joint width, abut intermediate flange 148 at its upper end and annular disc 144 at its lower end. The compensator connection is designed such that, even in a completely compressed state, there is no contact between the facing ends of the refractory linings which define joint 162 whereby the linings are not damaged by mechanical stresses. The length of the shielding tube 160 must, of course, be selected to allow all possible displacements which may occur in service.

The compensator connection of FIG. 5 is assembled by first introducing the compressible refractory material 156, 158 over the supporting bushing 152 on conduit 106. Thereafter, the shielding tube 160 will be inserted over the outer layer of refractory material 158. In installing the shielding tube 160 the holding ring segments 166 and 166' thereon are caused to pass between the upper support ring segments 168, 168' on bellows connection fitting 138 and between the ring segments 170, 170' on the lower connection fitting 140 of the bellows. Subsequent to installation, the shielding tube 160 is rotated through an angle of 90° so that the ring segments on the shielding tube and those on the bellows connection fittings are in overlapping relationship. With the shielding tube in the position shown in FIG. 5 the locking element or elements 174 is inserted in connection fitting 138; the locking element thus passing through the notch 172 in holding ring 164 of shielding tube 160. Insertion of locking element 174 prevents further rotation of shielding tube 160 and the shielding tube is thus secured in position in the manner of a bayonet union. Obviously, to permit assembly, the spacing between the individual segments of the support rings 168 and 170 on the connection fittings of bellows 136 must be greater than the length of the segments 166 of the holding ring on the shielding tube 160.

With the shielding tube 160 in place, upper conduit 104 can be introduced in such a manner that the supporting bushing 154 passes to the inside of the inner layer of compressible refractory material 156. When conduit 104 is fully installed, to the position shown in FIG. 5, the flanges 146, 148 and 150 may be fastened together by any suitable means. The intermediate flange 148 is incorporated in the assembly in the interest of facilitating replacement of shielding tube 160 and the refractory material 156, 158 if necessary. It should also be noted that the lower holding disc 154 may be replaced by a flange connection similar to that established by flanges 146, 148 and 150. Alternately, the holding disc 144 of FIG. 5 may be replaced by the flange arrangement such as that shown in FIG. 5c.

Figure 5C:
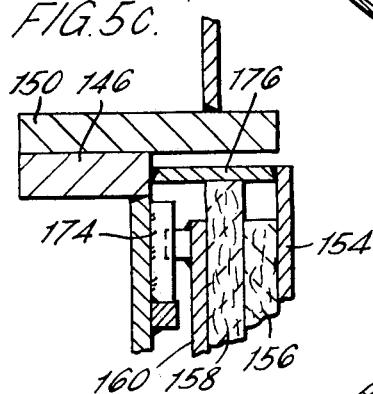
FIG. 5c is a partial view, on an enlarged scale, of a modified version of the embodiment of the compensator connection shown in FIG. 5.
Figure 5B:
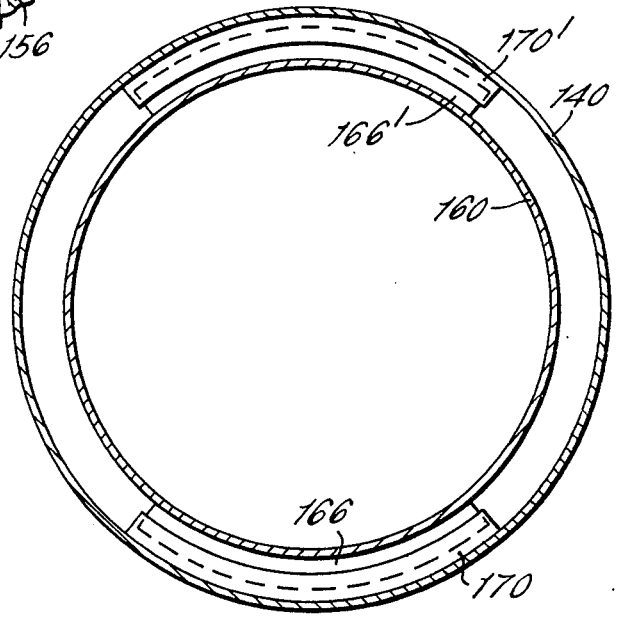

With reference now to FIG. 5c, an alternate embodiment of the upper flange connection of the compensator connection of FIG. 5 is shown in a partial enlarged cross-sectional view. In the embodiment of FIG. 5c the flange 146 of the compensator connection is bolted directly to the flange 150; i.e., the intermediate flange 148 has been eliminated. During assembly of the embodiment of FIG. 5c, after the compressible refractory material 156, 158 and the shielding tube 160 have been installed on the lower conduit 106, an annular holding disc 176 is welded between the support bushing 154 and flange 146 of the compensator connection.

A further embodiment of a compensator connection in accordance with the present invention is shown in FIG. 6. The elements in FIG. 6 which correspond to elements in the FIG. 5 embodiment have been identified by use of the same reference numerals. A principal distinction between the embodiments of FIGS. 5 and 6 is that in FIG. 6 no holding and supporting rings for facilitating the insertion of and limiting motion of shielding tube 160 are employed. Thus, the function of the holding and supporting rings of FIG. 5; i.e., limitation of the axial expansion of the bellows resulting from forces developed in or applied to conduits 104 and 106; is performed by a universal joint or Cardan connection in the FIG. 6 embodiment.

Continuing wth a discussion of FIG. 6, the upper flange 146 of the compensator connection is provided with a pair of opposed hinged arms 180, 180', only arm 180 being shown in the drawing, which are connected by means of a Cardan ring 182 to hinged arms 184, 184', only arm 184 being shown, which extend from the lower conduit 106. The hinged arms on each conduit are offset by 180° about the circumference of the conduit and the oppositely extending arms on the two conduits are offset by 90° from one another. The hinged arms on the conduits are provided with elongated slots such as slot 186 in arm 180 and slot 188 in arm 184. Pivot bolts extend through the elongated slots and serve to couple the hinged arms to the Cardan ring while permitting a limited displacement of the arms with respect to the ring. Thus, a pivot bolt 190 passes through slot 186 in arm 180 as shown while a pivot bolt 192 is shown positioned in slot 188 of arm 184. Longitudinal relative displacement between conduits 104 and 106 may be absorbed in and thus compensated by the Cardan connection, particularly through movements of the hinged arms with respect to the Cardan ring. Relative longitudinal movements may also be absorbed and any buckling movements will be compensated by the elastic refractory material 156, 158 in the manner to be described in the discussion of FIG. 7. The limitation on the longitudinal mobility of conduits 104 and 106 in the FIG. 6 embodiment is established by the length of the slots in the hinged arms and the diameter of the pivot bolts.

The compensator connection depicted in FIG. 6 may be employed in the tuyere stock of FIG. 3. It is to be noted that, while the stock of FIG. 3 has been discussed as employing two different embodiments of the present compensator connection, in actual practice the compensator connections 110 and 112 will be identical and will be in accordance with one of the disclosed embodiments of the present invention.

Referring now to FIG. 7, which employs the same reference numerals as utilized in FIGS. 5 and 6, conduits 104 and 106 are depicted as undergoing a buckling displacement. This buckling displacement results in a compression of the refractory material 156, 158 which is located within the shielding tube 160. On the side of the joint where the width thereof is reduced as a result of the displacement, the refractory material 156, 158 is compressed at the oppositely disposed ends thereof with the outer layer of material 158 undergoing additionally a longitudinal compression as a result of its contact with the upper intermediate flange 148 and the lower annular disc 144. At the opposite side of the joint where the gap between the refractory linings on conduits 104 and 106 has been enlarged, the refractory material 156, 158 is compressed in its central region in the vicinity of the joint as a result of being urged against shielding tube 160 by the supporting bushings 152 and 154. In order to avoid damage to the radially inwardly disposed layer 156 of compressible refractory material, the facing extremities of the supporting bushings 152 and 154 are inclined toward the axes of their respective conduits. The diameter of the shielding tube 160 is selected to provide contact with the outer layer 158 of compressible refractory material in the normal undistorted position of the compensator connection. The diameter of shielding tube 160, however, is also selected so as to permit installation of the tube over the refractory layers 156, 158 during assembly.

The above-described compensator connection affords maximum moblity of the conduits being coupled and maximum protection of the bellows which imparts hermeticity to the expansion joint; the bellows being the element of the connection most susceptible to damage and failure. Compensator connections in accordance with the present invention also limit, due to their construction, undesirable or excessive relative displacements between the conduits being coupled. As a further advantage precipitated by the present invention, the mobility offered thereby permits a "two hinged tuyere stock" assembly wherein the tuyere nozzle may be rigidly connected to the tuyere and the nozzle-tuyere assembly held in the requisite position with respect to the furnace wall. Compensator connections in accordance with the present invention are, of course, also well suited for use in "three hinged tuyere stocks" wherein there is a spherical joint sealing surface at the furnace wall. The ability to use the present compensator connections in "three hinged tuyere stocks" results from the fact that the invention limits the longitudinal extension of the expansion joint. Limitation of the longitudinal displacement of the joint has the further advantage that the bellows is not unduly stressed during transportation or mounting of tuyere stocks employing the present novel compensator connections.

While preferred embodiments have been shown and described, various modifications nd substitutions may be made thereto without departing from the spirit and scope of the invention. Thus, while the compensator connections of the present invention have been discussed primarily in terms of use in the environment of a tuyere stock, the invention is applicable to any environment wherein lined conduit sections are to be interconnected via an expansion joint. Accordingly, it is to be understood that the present invention has been described by way of illustration and not limitation.

I claim:

1. An expansion joint device for interconnecting fluid conducting conduits provided with a refractory lining comprising:
   open ended expansible bellows means, said bellows means being adapted to be connected at its oppositely disposed ends to the exterior of the conduits to be coupled to render the joint between the facing ends thereof hermetic;
   at least a first protective layer of heat resistant material surrounding at least a portion of the outer diameter of extensions of the conduits to be coupled, said first protective layer bridging the joint between the conduits; and
   a shielding tube, said shielding tube being spatially displaced from said bellows means and being coaxial with the bellows means and the conduits to be coupled when the conduits are in an undeflected condition, said shielding tube being positioned within the bellows means and radially outwardly with respect to said first protective layer, said shielding tube extending axially in both directions with respect to the joint between the conduits and being supported for movement relative to at least one of the joint defining conduit facing ends.

2. The expansion joint device of claim 1 wherein said first protective layer comprises:
   a compressible refractory material.

3. The expansion joint device of claim 2 wherein said layer of compressible refractory material is in contact with the inner diameter of said shielding tube and is normally in compression between said shielding tube and the exterior of the conduits being coupled.

4. The apparatus of claim 2 further comprising:
   a second layer of compressible refractory material disposed between said first layer of compressible refractory material and the interior of said shielding tube.

5. The expansion joint device of claim 4 wherein said second layer of compressible refractory material is in contact with the inner diameter of said shielding tube and said layers of refractory material are normally in compression between said shielding tube and the exterior of the conduits being coupled.

6. The expansion joint device of claim 1 wherein said shielding tube is rigid.

7. The expansion joint device of claim 2 wherein said shielding tube is rigid.

8. The expansion joint device of claim 5 wherein said shielding tube is rigid.

9. The expansion joint device of claim 1 wherein said bellows means includes:
   a bellows; and
   means for connecting said bellows to the exteriors of the conduits to be coupled, said connecting means including radially inwardly extending flanges at the oppositely disposed ends of the joint device.

10. The expansion joint device of claim 9 wherein said shielding tube is shorter than the axial distance between said connecting means flanges and is comprised of a rigid material.

11. The expansion joint device of claim 10 wherein the shielding tube limits the relative angular displacement of the conduits and the spacing between the shielding tube outer diameter and said bellows means is selected such that there will be no contact therebetween with the expansion joint device subjected to the maximum angular deflection permitted by the length of said shielding tube.

12. The expansion joint device of claim 11 wherein said first protective layer comprises:
   a compressible refractory material.

13. The apparatus of claim 12 further comprising:
   a second layer of compressible refractory material disposed between said first layer of compressible refractory material and the interior of said shielding tube.

14. The expansion joint device of claim 13 wherein said second layer of compressible refractory material is in contact with the inner diameter of said shielding tube and said layers of refractory material are normally in compression between said shielding tube and the exterior of the conduits being coupled.

15. A tuyere stock for use in the delivery of hot air from a source to a blast furnace comprising:
   a tuyere, said tuyere being adapted to be at least partly inserted through a port in the wall of a furnace;
   a tuyere nozzle;
   means coupling the upstream end of said tuyere to the downstream end of said nozzle;
   a curved conduit section;
   means coupling the upstream end of said nozzle to the downstream end of said curved conduit section; and
   linear conduit means coupling the upstream end of said curved conduit section to the source, said linear conduit means including at least a first straight conduit with compensator connections at the opposite ends thereof, said compensator connections each comprising:
   open ended expansible bellows means, said bellows means being adapted to be connected at a first end to the exterior of said straight conduit and at the second end to the exterior of a facing hot air transmission conduit to render the joint between said straight and transmission conduits hermetic;
   at least a first generally annular protective layer of compressible refractory material, said protective layer of refractory material bridging the joint between the conduits; and
   a rigid shielding tube, said shielding tube being spatially displaced from said bellows means and being coaxial with the bellows means when the tuyere stock is is an undeflected condition, said shielding tube being positioned within the bellows means and radially outwardly with respect to said first protective layer of refractory material, said shielding tube extending axially in both directions with respect to the joint between the conduits and being supported for movement relative to at least one of the joint defining conduit facing ends.

16. The tuyere stock of claim 15 wherein said means coupling the tuyere to the nozzle establishes a rigid connection therebetween and wherein said tuyere stock further comprises:
means for guiding and positioning said rigidly connected tuyere and nozzle to prevent movement thereof with respect to the furnace wall whereby said tuyere stock is a two hinged stock with all thermally induced expansions being absorbed in said pair of compensator connections of said linear conduit means.

17. The tuyere stock of claim 16 wherein said first protective layer of compressible refractory material is in contact with the inner diameter of said shielding tube and is normally in compression between said shielding tube and the exterior of said straight and transmission conduits.

18. The tuyere stock of claim 17 wherein said bellows means comprises:
a bellows; and
means connecting said bellows to the exterior of the conduits at either side of the compensator connection, said connecting means including radially inwardly extending flanges at the oppositely disposed ends of the compensator connection.

19. The tuyere stock of claim 18 wherein said shielding tube is shorter than the axial distance between said connecting means flanges.

20. The tuyere stock of claim 19 wherein the shielding tube limits the relative angular displacement of the conduits and the spacing between the shielding tube outer diameter and said bellows means is selected such that there will be no contact therebetween with the expansion joint device subjected to the maximum angular deflection permitted by the length of said shielding tube.

* * * * *